Feb. 20, 1968         C. P. DE BIASI         3,369,461

AUTO KINETIC WHEEL OR FLUID MOTOR

Filed June 9, 1966         3 Sheets-Sheet 2

INVENTOR.
CHARLES P. DE BIASI

BY
ATTORNEY.

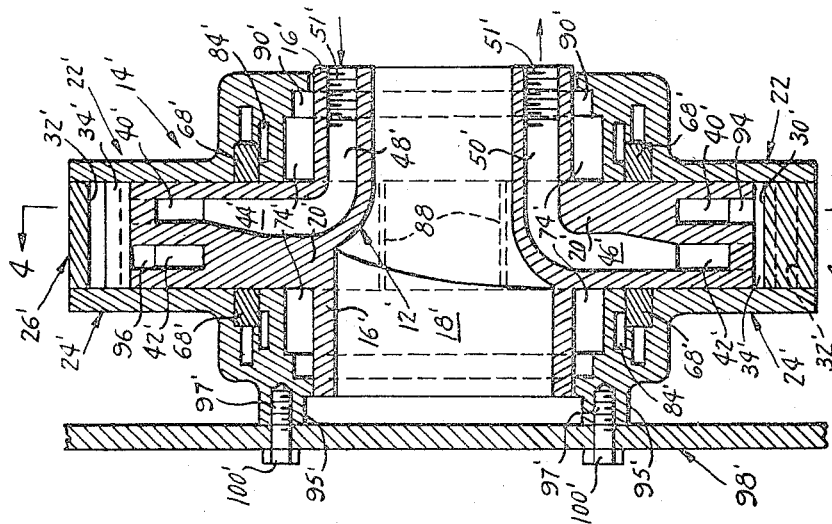
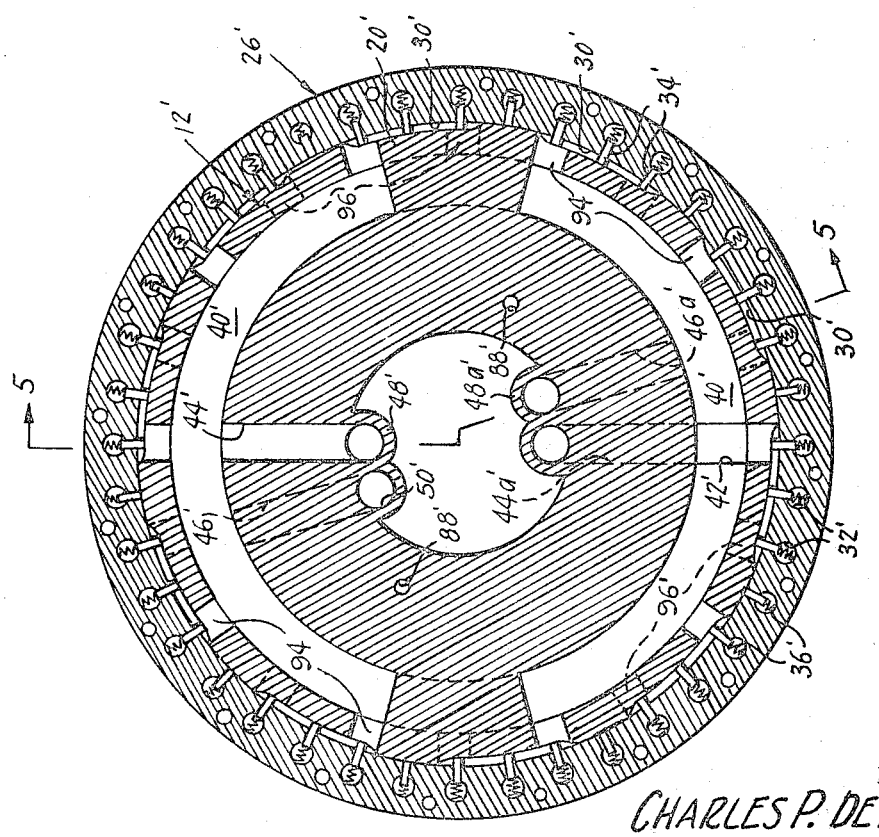

United States Patent Office 3,369,461
Patented Feb. 20, 1968

3,369,461
AUTO KINETIC WHEEL OR FLUID MOTOR
Charles P. De Biasi, 74 Braman Road,
Waterford, Conn. 06385
Continuation-in-part of application Ser. No. 397,740,
Sept. 21, 1964. This application June 9, 1966, Ser.
No. 556,489
11 Claims. (Cl. 91—73)

ABSTRACT OF THE DISCLOSURE

This invention relates to a hydraulic wheel having an internal stationary shaft and an outer segment rotatably mounted thereon for driving a suitable work member, such as a wheel. In accordance with one embodiment of the invention, the propulsion fluid is directed through the stationary portion of the wheel, then through a part of the rotating portion and then to a suitable working segment where the fluid reacts against movable vanes to propel the outer rotary portion of the wheel. In accordance with another embodiment of the invention, the propulsion fluid is directed through the stationary shaft of the wheel into the working segments. Suitable bearings are positioned between the rotary and stationary parts of the wheel and are lubricated by allowing a small portion of the propulsion fluid to leak into the bearing area.

---

Figure 1:
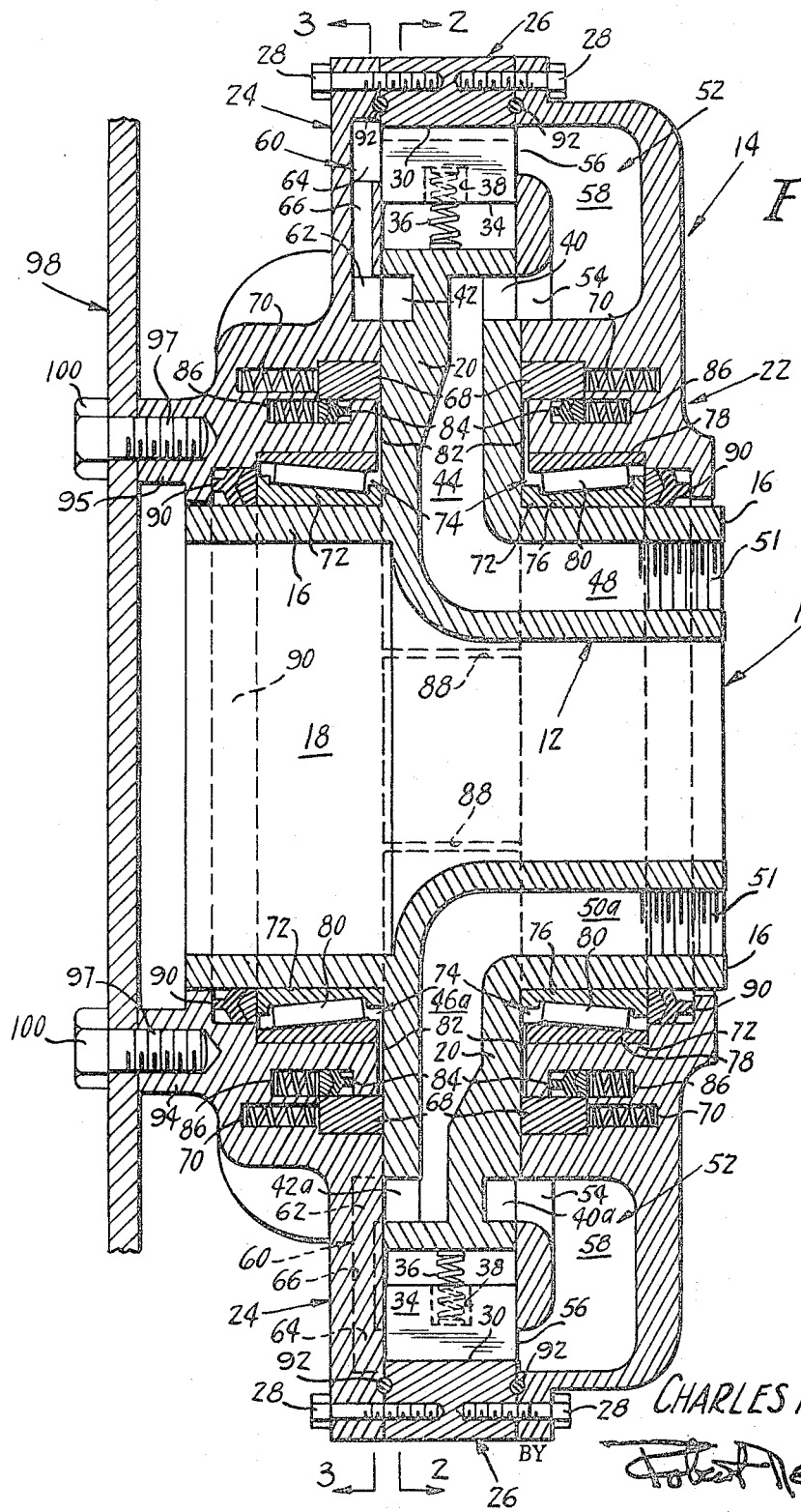

This application is a continuation-in-part of my application Ser. No. 397,740 filed Sept. 21, 1964, entitled Auto Kinetic Wheel or Fluid Motor, now U.S. Patent 3,280,934.

The present invention relates, generally, to an auto kinetic wheel or fluid motor that is particularly adapted to supply torque to a driving wheel, such as a pneumatic tire, a driving sprocket, an endless track, a rim particularly adapted for use upon a rail, and the like, and even a combination thereof.

More particularly, this invention relates to a fluid motor comprising a stationary portion and a rotatably movable portion, said motor being so constructed and arranged as to form a component part of a driving wheel that is particularly adapted to have any one of a number of diverse types of wheel elements structurally operatively associated therewith, such as a pneumatic tire, a driving sprocket, an endless track, a rim particularly adapted for use upon rails, and the like, and even a combination thereof.

One of the problems arising in propelling a vehicle by means of fluid power is the fact that during maximum acceleration the fluid motor will require maximum torque but a limited amount of fluid volume. However, when travelling at maximum speed the motor does not require the maximum torque but does require a maximum fluid volume. Therefore, it is a primary object of this invention to provide a multi-displacement auto kinetic wheel or fluid motor which may be operated on a maximum number of vane segments during maximum acceleration and on only a portion of the vane segments when only high speed is desired.

Other objects and important features of this invention are set forth in the above mentioned co-pending application, Ser. No. 397,740 filed Sept. 21, 1964, now Patent 3,280,934, and such other objects and important features as therein set forth are likewise objects and important features of the present invention.

Still other objects and important features of the present invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Figure 2:
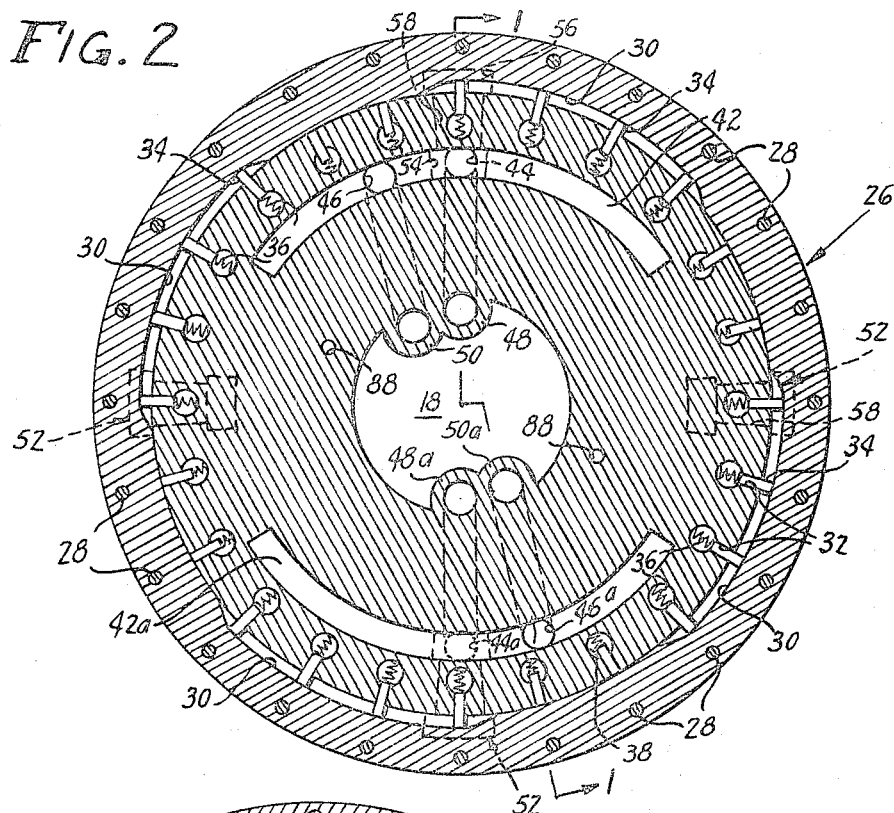
Figure 3:
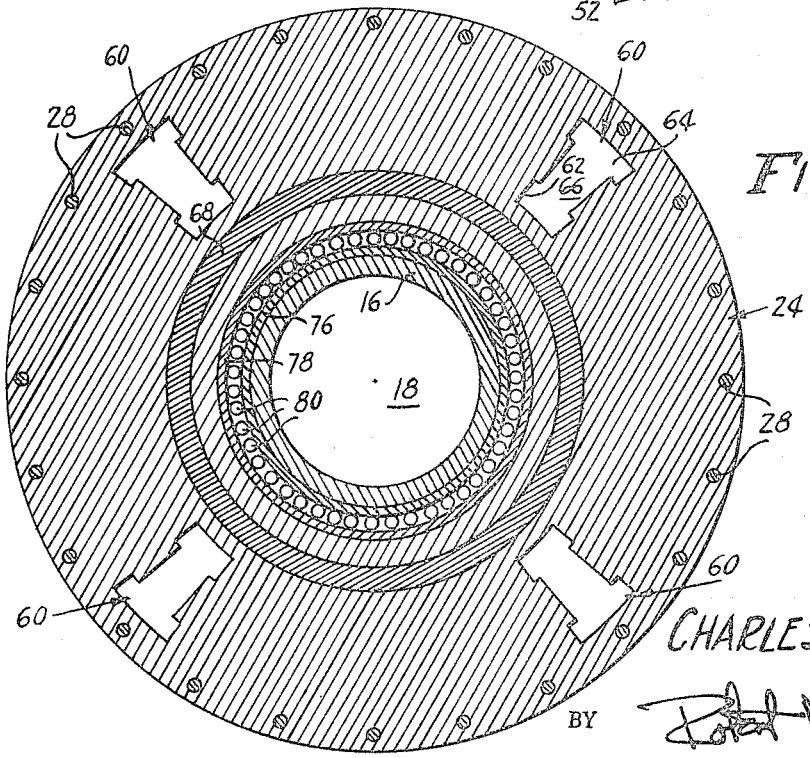

In the drawings:
FIG. 1 is a cross-sectional iew of a fluid motor constructed in accordance with the present invention;
FIG. 2 is a cross-sectional view taken along the line 2—2 of FIG. 1;
FIG. 3 is a cross-sectional view taken along the line 3—3 of FIG. 1;
FIG. 4 is a cross-sectional view of a modification of a fluid motor constructed in accordance with the present invention; and
FIG. 5 is a cross-sectional view taken along the line 5—5 of FIG. 4.

With reference now to the drawings, and particularly FIGS. 1, 2, and 3, thereof, there is illustrated therein a fluid motor or motorized wheel 10, constructed in accordance with the principles of the present invention, comprising a fixed or stationary generally cylindrical shaft member 12, and a generally cylindrical housing member 14 rotatably mounted upon and about the shaft member 12.

The shaft member 12 comprises a generally cylindrical base portion 16 having a generally centrally disposed axial opening or bore 18 extending therethrough, and a radial flange portion 20 extending radially outwardly from the base portion 16 generally intermediate the ends thereof. The base portion 16 is particularly adapted to be fixedly structurally operatively associated with any suitable fixed support of a vehicle (not shown). This may be accomplished in any suitable manner, and, for example, the portion 16 may be provided with threaded bores (not shown) with which any suitable fastener (also not shown), such as cap screws, bolts, and the like, are particularly adapted to be threadably mutually cooperatively engageable.

The housing member 14 comprises a first completely annular section or plate 22 which is rotatably mounted upon the base portion 16 of the shaft member 12 adjacent one side or surface, namely, an input side or surface, of the flange portion 20, thereof, and a second annular section or plate 24, which is rotatably mounted on the base portion 16 adjacent the opposite side or surface, namely, an output side or surface, of the flange portion. An annular ring or cam ring 26 is disposed or positioned radially outwardly of and in rotatably slidable engagement with the exterior or peripheral surface of the flange portion 20, and is secured to the first and second annular housing plates 22 and 24 in any suitable manner, as through the medium of suitable fasteners 28. The ring or cam ring 26 is provided on its interior surface with a plurality of substantially equi-spaced generally arcuately or circumferentially extending segments or recesses 30 therein for a purpose to be more fully described hereinafter. While four recesses 30 are illustrated by way of example, it will be understood that the number or quantity thereof may be varied, depending upon desired characteristics of the motor, such as torque output, rotational velocity, and the like. At least one other example will be described hereinafter.

With particular reference now to FIGS. 2 and 3, the flange portion 20 of the shaft member 12 is provided with a plurality of radially outwardly extending slots or grooves 32 equally spaced about the periphery thereof. A vane member 34 is particularly adapted to be radially reciprocally or slidably mounted in each of the grooves 32, and is urged or biased outwardly into mutual cooperative engagement with the interior surface of the ring or cam ring 26 by a coil spring 36 disposed or positioned within each of the grooves 32, and extending into a hollow portion 38 thereof. The vane members 34 and springs 36 may be fabricated of any suitable material, and may be of any suitable construction. In addition, the number or quantity of vane members 34 and corresponding grooves 32 may be varied, as may the number of segments 30, depending upon the aforesaid desired characteristics of the motor 10. For exemplary purposes only, therefore, there is illustrated 24 vanes 34, four of such vanes being particularly adapted to extend to within a corresponding one of the segments 30 at any one time. Another example, as hereinbefore pointed out, will be discussed hereafter.

The flange portion 20 is provided with a first annular groove portion 40 and a second annular groove portion 40a generally aligned with the first annular groove portion 40 in the aforesaid one side or input surface facing the first annular housing plate 22, and a third annular groove portion 42 and a fourth annular groove portion 42a aligned with the third annular groove portion 42 in the opposite side or output surface thereof facing the second annular housing plate 24. The shaft member 12 is provided with radially extending bores 44 and 44a having the radially outer ends thereof in communication with the annular groove portions 40 and 40a, and with radially extending bores 46 and 46a having the radially outer ends thereof in communication with the annular groove portions 42 and 42a. The shaft member 12 is particularly adapted to form the fluid conduits 48, 48a, 50 and 50a, the inner ends of which are particularly adapted to connect with and correspond with the radially inner ends of the bores 44, 44a, 46 and 46a, enabling the presentation of a shaft member comprising a flange portion, namely, the portion 20, that is so constructed and arranged as to present integrally fabricated fluid conduits, such as the conduits 48, 48a, 50 and 50a, and bores, such as the bores 44, 44a, 46 and 46a, thus eliminating the need for any number of separate, individual, independent and distinct connections. Each of the conduits 48, 48a, 50 and 50a are provided with interiorly threaded portions 51 for connection through suitable fluid lines (not shown). The fluid conduits 48, 48a, 50 and 50a are particularly adapted to be utilized both to convey fluid under pressure from a suitable supply source, such as a pump (not shown) and reservoir (also not shown), to the shaft member 12, and to convey or exhaust fluid from the shaft member bores 44, 44a, 46 and 46a to the reservoir (not shown) in a manner to be described more fully hereinafter.

With continued reference now to FIGS. 1 through 3, the first annular plate 22 of the housing member 14 has formed therein a plurality of radially extending channels 52 of generally U-shaped configuration having the radially inner end thereof in communication with the annular groove portions 40 and 40a in the shaft member flange portion 20. While any number of the channels 52 may be provided, four such equip-spaced channels are presented corresponding to the number of segments 30. As pointed out above, the radial inner end of each channel, as defined by a leg 54 thereof, is disposed in communication with the annular groove 40. A radial outer end of each channel, as defined by a leg 56, is disposed in communication with each of the segments 30. With particular reference now to FIG. 2, it will be seen that each of the legs 54 and 56 are, in cross-section (as viewed in FIG. 2), of generally arcuate rectangular configuration in a direction extending generally transversely of the plate 22, with the leg 56 being of somewhat greater transverse dimensional extent than the leg 54. The bight 58 of each channel 52 extends between each of the legs 54 and 56, and is of less transverse dimensional extent than each of them. It may now be said that each leg 54 and 56 defines an opening or aperture, one providing communication with the respective groove 40 and 40a, and the other providing communication with the respective chamber 30. The bight 58 defines a fluid passage providing communication with and between the apertures or legs 54 and 56.

Similarly, the second annular plate 24 of the housing member 14 has formed therein a plurality of radially extending channels 60 having the inner ends thereof in communication with the respective groove portions 42 and 42a. To this end, the plates 22 and 24 may be fabricated substantially identical with one another. When the plates are operatively associated with the ring 26, to form or define the housing 14, they are disposed in rotatively spaced relationship with respect to one another, enabling the channels 52 and 60 to be located, disposed, or positioned in rotatively spaced relationship with respect to one another, as illustrated particularly in FIGS. 2 and 3. Accordingly, and as will be described more fully hereinafter, the legs 56 of each of the channels 52 are disposed in communication only with one end of a corresponding one of each of the chambers 30, while one leg of each of the channels 60, to be described hereinafter, communicates only with an opposite end of the said corresponding one of the channels. It will now be understood that the plate 24 would be illustrated in FIG. 1 substantially identical to the plate 22, if the former was rotatably moved annularly, as viewed in that figure. Accordingly, and to facilitate an understanding of the present invention, a portion of the plate 24 is rotated in the aforesaid manner to enable a plurality of the channels 60 to appear in dotted lines. It is again emphasized, however, that these channels are disposed in rotatably spaced or phased relationship with respect to the channels 52. This particular angular relationship will vary in accordance with the number of segments 30, it being this particular value of 45 degrees when four such segments are presented, as illustrated.

As pointed out above, the plates 22 and 24 are identical. Accordingly, the channels 60 may be of substantially the same configuration as the channels 52, notwithstanding the manner in which they are illustrated in FIG. 1, which is to facilitate an understanding of the present invention, as also pointed out above, and, therefore, are of generally U-shaped configuration equi-spaced about the plate 24, with four such channels being provided in the illustrated example. The channels 60 comprise a plurality of legs 62 and 64 which, in cross-section (as viewed in FIG. 3), are of generally arcuate rectangular configuration in a direction generally transversely of the plate, with the leg 64, which defines an aperture providing communication with the segments 30, being of somewhat greater transverse dimenisonal extent than the leg 62, which defines an aperture in communication with the respective groove 42 and 42a. The bight 66 of the channels 60, like the bight 58, defines a fluid passage providing communication with and between the apertures 62 and 64. It will now be understood that the channels 52 and 60 are similar, the particular manner in which the channels 60 are illustrated being for purposes of facilitating an understanding of the invention, as pointed out above.

As seen in FIG. 2, the arcuate apertures 56 in the housing plate 22 are located, disposed or positioned adjacent corresponding ends of the segments 30 in the ring or cam ring 26, and the arcuate apertures 64 in the housing plate 24 are disposed adjacent the opposite corresponding ends of the cam ring segments 30. Thus, it will be readily seen that, since the plates 22 and 24 are structurally operatively associated with the ring 26, and are, therefore, particularly adapted to be rotatably moved therewith, the arcuate apertures 56 and 64 are particularly adapted to be disposed in constant communication with the ends of the ring segments 30, and may, therefore, be utilized to supply fluid to or to drain or exhaust fluid therefrom.

The grooves 40, 40a, 42 and 42a are located in a corresponding one of each face of the flange portion 20 of the shaft member 12, immediately adjacent the inner faces of the plate members 22 and 24. In accordance with the hereinbefore set forth construction, it will be understood that the plate members are rotatably movable relative to the shaft member 12, and, thus, the flange portion 20 is likewise rotatably mounted. Accordingly, it is desirable that leakage between these relatively movable members be substantially completely precluded, particularly since a further criterion is that substantially all of the pressure fluid be directed into the segments 30 on the supply side, enabling the presentation of a fluid motor, such as the motor 10, operable with maximum efficiency and substantially non-existent loss, leakage and wastage of fluid pressure.

To this end, each of the cylindrical plate members 22 and 24 are provided with completely annular seal rings 68, which may be fabricated of any suitable material, such as metal, and may be of any suitable construction. These seal rings are positioned or located in the interior faces of the plates 22 and 24, enabling them to be disposed in sealing mutual cooperative engagement with the oppositely disposed exterior faces of the flange portion 20 of the shaft member 12. To insure that the sealing rings are maintained in this relationship with the flange portion, biasing means, such as coil springs 70, are particularly adapted to be positioned axially outwardly of and behind the rings to urge them in a direction towards the portion 20. In addition, the rings 68 are particularly adapted to be positioned or located radially inwardly of and substantially adjacent to the grooves 40, 40a, 42 and 42a, to preclude leakage in a direction generally radially inwardly thereof. Any leakage in a direction generally outwardly of the grooves 40, 40a, 42 and 42a will tend to enter the slots 32, and eventually find its way into the segments 30, though such leakage is substantially precluded, as will be discussed hereinafter. Accordingly, it can be seen that the need for manufacturing the various component parts of the fluid motor 10, as hereinbefore described, at very close manufacturing tolerances has been substantially decreased. In fact, only the surfaces that affect the efficiency of the motor 10 must be accurately machined or finished to close tolerances.

As hereinbefore pointed out, the housing member 14 is rotatably structurally operatively associated with, upon and about the shaft member 12. Accordingly, each of the plates 22 and 24 are provided with annular bearing housings 72 within which antifriction bearings 74 are particularly adapted to be disposed, the bearings 74 being particularly adapted to carry or bear the friction introduced by and between the relatively movable members 12 and 14. The bearings 74 may be of any suitable construction, and, in the exemplary form illustrated, the use of a tapered roller bearing comprising inner and outer races 76 and 78, and generally cylindrical rollers 80 disposed therebetween is invoked. It is, of course, both necessary and desirable that the bearings 74 be lubricated. This is accomplished with facility through the medium of the seal ring 68. Thus, assuming that fluid pressure is supplied to the segments 30 through the conduit 48, such fluid pressure will enter the annular groove 40 through the radially extending bore 44. Fluid under pressure in this groove will, in addition to flowing through the channels 52, tend to flow between the plate 22 and the input face or surface of the flange portion 20 of the shaft member 12. The seal ring will tend to preclude leakage therepast, but, under the influence of the spring 70, and by choosing the ring accordingly, will enable a minimal portion of fluid pressure to flow therepast. Hereinbefore, it was pointed out that manufacturing tolerances need not be close. In fact, at the location radially inwardly of the rings 68, the plates 22 and 24 can be so configured and arranged as to present a gap 82. This gap will provide communication between the location of the seal ring 68 and the bearings 74. Any fluid pressure that flows past the seal ring 68 into the gap 82 adjacent the input side or surface of the flange portion, will, therefore, flow towards the bearing housing 72 in the plate 22 to lubricate the bearing 74. It is considered readily apparent that this same sequence of flow will take place when fluid pressure is supplied to any of the conduits 48, 48a, 50 and 50a.

It is desirable that all of the leakage of lubricating fluid past the seal ring 68 be directed to the bearings 74 and to this end, each of the plates 22 and 24 are provided with annular oil ring seals 84 disposed, positioned or located radially inwardly of but substantially immediately adjacent the seal rings 68. These rings may be fabricated of any suitable material, may be of any suitable construction, and preferably are maintained in the illustrated position, enabling each to efficiently perform its function, in any suitable manner, as, for example, by means of a coil spring 86. In accordance with this construction the seal rings 84 define, in effect, single acting or one-way check valves, enabling flow to take place therepast in one direction only. Accordingly, should the pressure of lubricating fluid in the area of the gap 82 be greater than exhaust pressure along the exhaust side of the motor, the fluid will be directed to that side of the motor, and thence to one of the conduits 48, 48a, 50 and 50a or to those of such conduits connected to the aforesaid reservoir (not shown). It is, of course, desirable to lubricate both of the bearings 74, and to this end, the shaft member 12 is provided with a plurality of fluid ports 88 extending between the bearing housings 72. Accordingly, fluid pressure entering either of the bearing housings 72, depending upon which of the grooves 40, 40a, 42 and 42a are pressurized, will flow through the fluid ports 88 to the other of the bearing housings 72.

It will therefore be understood that a fluid motor constructed in accordance with the present invention such as the motor 10, is so constructed and arranged as to make use of substantially all of the supplied fluid pressure, resulting in maximum efficiency, even though close manufacturing tolerances are not required, and yet is self-lubricating, both with respect to the pressure and exhaust sides of the motor. In addition, the aforesaid construction presents an internally case drained system, enabling fluid pressures to be returned to exhaust. And, since the fluid motor 10 is internally case drained, the need for separate, independent and external conduits from the motor to exhaust is eliminated. Moreover, it will be understood that high pressure fluid is sealed by the sealing rings 84, which are not in contact with moving parts, thus increasing the effective life thereof, resulting in only a low pressure acting on those seals that are in contact with moving parts, such as seal rings 90, presently to be described, thus increasing their effective life. Still further, and as hereinbefore pointed out, the percentage of area of the motor that must be accurately machined or finished is reduced.

A seal ring 90 is positioned axially outwardly of each of the bearing housings 72 to preclude the leakage of lubricating fluid outwardly of and from the bearings 74. The rings 90 may be of any suitable construction, and may be fabricated of any suitable material, keeping in mind only that they are subject to wear since they are disposed between relatively movable parts, namely, the base portion 16 of the shaft member 12, and to the plates 22 and 24 of the housing member 14.

In the operation of the fluid motor 10, it is desirable that during maximum acceleration, as when starting, that all of the vane segments 30 be utilized to produce maximum torque. Accordingly, if fluid under pressure is supplied to the integral conduits 48 and 48a, for example, by a pump or pumps (not shown), the fluid flows into the shaft member radial bores 44 and 44a, and thence into the annular flange groove portions 40 and 40a. The fluid then passes into each of the channels 58, through the apertures or legs 54 in the first annular housing plate 22 and flows radially outwardly into the arcuate apertures 56 therein. Since the arcuate plate apertures 56 are in constant communication with corresponding ends above the ring or cam ring segments 30, the fluid passes into these segments, and is trapped between the ends thereof and the adjacent vane member 34. The fluid under pressure thus exerts a force against the portions of the ring 26 defining the end of each segment 30 adjacent the arcuate apertures 56 and against the adjacent vane members 34 in each segment. Since the vane members 34 are mounted only for radial movement on the stationary shaft member 12 and thus cannot move in a circumferential direction, the fluid under pressure in each segment 30 causes the cam ring 26 to rotate about the shaft member 12 in a generally counter-clockwise direction. Since the housing plates 22 and 24 are secured to the ring 26 they rotate therewith about the base portion 16 of the shaft member 12. As the leading end of each segment 30 passes a vane member 34, therefore, a force is applied to the cam ring 26 by the fluid pressure between the vane member 34 and the leading segment end, thereby resulting in a smooth, positive and continuous rotation of the housing member 14 about the shaft member 12.

In order to drain the fluid in the segments 30 from the opposite corresponding ends thereof, the integral conduits 50 and 50a lead to the aforesaid fluid reservoir (not shown). The arcuate apertures 64 in the second housing plate 24 thus will constantly drain fluid from the trailing ends of the segments 30, which fluid will flow radially inwardly through the radial passages in the housing plate 24, into the annular groove portions 42 and 42a through the arcuate apertures 62, and thence through the radial shaft bores 46 and 46a into the drain conduits 50 and 50a.

Accordingly, it may be seen that when a fluid under pressure is supplied to both of the conduits 48 and 48a and drained from both of the conduits 50 and 50a all of the segments 30 will be operatively connected resulting in the greatest surface area being subjected to the pressurized fluid and the torque produced will be at a maximum.

When, however, maximum speed is desired then the motor 10 may be operated on only a portion of the segments 30 by connecting only one of the fluid conduits 48 and 48a to the pump or pumps (not shown) so that the fluid flows only to one of the arcuate groove portions 40 and 40a and thence to only one-half of the segments 30. With a similar pressure and volume of fluid being applied to only one of the conduits 48 and 48a, as was applied in the previous configuration, it is obvious that the segments 30 will be rotated at twice the speed with one-half the torque.

In order to insure against leakage of the pressure fluid outwardly of and from the fluid motor 10, a pair of O-rings 92 is provided between the annular housing plates 22 and 24 and the ring or cam ring 26 of the housing member 14. It is noted, however, that any other suitable or conventional type of sealing means could be utilized.

In order to reverse the direction of the instant motor 10, that is, rotate the housing member 14 in a clockwise direction, all that is required is to connect the desired number of the conduits 50 and 50a to the source of fluid pressure or pump (not shown), and to connect the conduits 48 and 48a to the reservoir (also not shown). This will result in fluid being supplied through the arcuate apertures 64 in the housing plate 24 to the opposite end of the segments 30 and being drained from the aforesaid end of the segments by the arcuate openings 56 in the housing plate 22. This reversal of flow in the conduits 48, 48a, 50 and 50a can easily be accomplished by connecting them to a conventional reversing valve or valves (not shown) which are operable to selectively connect the conduits to the fluid pressure source or to the reservoir. Likewise, the supply of pressurized fluid to the desired number of conduits can also easily be accomplished by connecting the conduits to conventional valve or valves which are operable to selectively connect the conduits to the fluid pressure source.

It is obvious that any suitable or desired number of segments 30 may be provided in the cam ring 26 and that any desired number of conduits and arcuate groove portions may likewise be provided without departing from the spirit and scope of the present invention, as hereinbefore pointed out. For example, there may be provided six such segments divided into groups of two by the groove portions and conduits. For maximum torque and acceleration all of the segments would be activated as above. For maximum speed with minimum torque two of the segments would be activated and for a compromise between torque and speed two groups of segments or four segments would be actuated. The motor 10 will, of course, still present a smooth, positive, continuous and controlled output. Also, any suitable means may be utilized to brake the motor 10 of this invention, including a self-braking system if the fluid circuit be a closed one.

It will now be understood that a fluid motor constructed in accordance with the principles of the present invention, such as the fluid motor 10, is so constructed and arranged as to supply a substantial tractive thrust or torque without necessitating the use of additional mechanisms, such as gears, torque multipliers, and the like. In addition, such a fluid motor is further so constructed and arranged as to apply the aforementioned substantial tractive thrust or torque tangential to its periphery, and substantially completely thereabout, in a direction corresponding to the desired direction of rotatable movement. Furthermore, such a fluid motor is reversible, and is still further so constructed and arranged as to enable the supply and exhaust of pressure fluid thereto and therefrom through the medium of fluid pressure conduits integral with a stationary portion thereof, eliminating the need for one or more direct connections to a rotatably movable portion thereof. Still further, a fluid motor constructed in accordance with the present invention, such as the fluid motor 10, is so constructed and arranged as to direct substantially all of the pressure fluid from a supply to the area or vicinity of a plurality of pressure chambers, substantially eliminating loss or wastage of said pressure fluid, and a resulting decrease in efficiency, and particularly in torque output, said fluid motor being so constructed and arranged as to enable a certain portion of said pressure fluid to be directed to locations requiring lubrication, and further enabling said pressure fluid to satisfy all of the requirements of propulsion and lubrication without necessitating the use of independent sources of supply and lubrication. Moreover, a fluid motor constructed in accordance with principles of the present invention, such as the fluid motor 10 is so constructed and arranged as to supply a substantial and variable thrust or torque at variable speeds without necessitating the use of additional mechanisms, such as gears, torque multipliers, and the like.

With reference now to FIGS. 4 and 5, wherein like reference characters indicate like parts, but wherein the reference characters are primed, there is illustrated therein a modification of a fluid motor constructed in accordance with the principles of the present invention. At this point, it will be understood that the fluid motor $10^1$ shown in FIGS. 4 and 5 is illustrated partially schematically to facilitate an understanding thereof, and since numerous of the component parts thereof have already been described with particularity in connection with the fluid motor 10 of FIGS. 1 to 3.

The fluid motor $10^1$ of FIGS. 4 and 5 is substantially similar in most respects to the motor 10 of FIGS. 1 to 3, with the exception that the relative positions of the segments $30^1$ and the vanes $34^1$ are reversed. Thus, the periphery of the flange portion $20^1$ of the shaft member $16^1$ is so configured and arranged as to present a plurality of such segments; and, in the exemplary form shown, there is provided ten such segments. As hereinbefore pointed out, the number or quantity of such segments, and of course, the number or quantity of cooperating vane members $34^1$ may be varied. In addition, the ring $26^1$ comprises a plurality of grooves $32^1$, in each of which there is positioned a radially reciprocal vane $34^1$. The vanes $34^1$ are particularly adapted to be urged radially inwardly toward the periphery of the flange portion $20^1$, similarly to the biasing of the fluid motor 10. It will be now seen that the vanes $34^1$ are particularly adapted to radially reciprocally move inwardly towards and be maintained in a camming mutual cooperative engageable relationship with the peripheral camming surface of the flange portion 20¹, enabling the fluid motor 10¹ to be operable in generally the same manner as the motor 10, the difference being that, in the latter, the camming surface on the ring 26 is rotatably movable, and the vanes 34 are stationary, while, in the former, the converse is true, namely, the vanes 34¹ are rotatably movable, and the camming surface on the flange portion 20¹ is stationary.

Inasmuch as the segments 30¹ are now positioned upon the peripheral surface of the flange portion 20¹, communication of fluid pressure may now be directly thereto. Accordingly, the annular groove portions 40¹, 40a¹, 42¹ and 42a¹ are now positioned in generally vertical alignment with the radial bores 44¹, 44a¹, 46¹ and 46a¹, respectively, and, in addition, the flange portion 20¹ comprises a plurality of passages 94 providing communication between the grooves 40¹ and 40a¹ and one end of each of the segments 30¹, and a similar plurality of passages 96 providing communication between the groove portions 42¹ and 42a¹ and the opposite end of each of the segments.

In all other respects, the fluid motor 10¹ is substantially similar to the fluid motor 10 of FIGS. 1 to 3, and, as hereinbefore pointed out, operates in generally the same manner. As hereinbefore pointed out, the number or quantity of groove portions, and, of course, the number or quantity of chamber sets may be varied.

It has hereinbefore been pointed out that the present invention relates to a fluid motor that is so constructed and arranged as to form a component part of a driving wheel that is particularly adapted to have any one of a number of diverse types of wheel elements structurally operatively associated therewith, such as a pneumatic tire, a driving sprocket, an endless track, a rim particularly adapted for use upon a rail, and the like, and even a combination thereof.

With continued reference now to FIGS. 1 to 5, there is illustrated therein an exemplary arrangement enabling the fluid motors 10 and 10¹ to be structurally operatively associated with any one of the aforesaid wheel elements, and others as well. To that end, and with reference first to the fluid motor 10 of FIGS. 1 to 3, the plate 24 is provided with a plurality of axially outwardly extending bosses 95 having interiorly threaded bores 97. A wheel element plate 98 may now be fixedly structurally operatively associated with the housing plate 24 of the housing 14 in any suitable manner, as by means of conventional fasteners 100. In a similar manner, a wheel element plate 98¹ may be fixedly structurally operatively associated with the housing plate 24¹ of the housing 14¹ of the fluid motor 10¹ of FIGS. 4 and 5. The wheel element plates 98 and 98¹ may take the form of a portion of a driving wheel such as a pneumatic tire, a wheel adapted to cooperate with a rail, a sprocket, and the like or a combination thereof all as clearly shown, described, illustrated and disclosed in my above mentioned co-pending application, Ser. No. 397,740 filed Sept. 21, 1964, now Patent 3,280,934, to enable the fluid motor 10 or 10¹ to be utilized directly such as in supporting and driving of a vehicle.

It will now be understood that a fluid motor constructed in accordance with the present invention, such as either one of the fluid motors 10 of FIGS. 1 to 3 or 10¹ of FIGS. 4 and 5, is so constructed and arranged as to form a component part of a driving wheel, which driving wheel is particularly adapted to have structurally operatively associated therewith any one of a number of diverse types of wheel elements, either singly, and even in combination, the fluid motor further being so constructed and arranged as to enable the driving wheel to be structurally operatively associated with or mounted upon a vehicle, in any suitable manner, and with extreme and unusual facility, as by means of conventional fasteners, such as cap screws, bolts, and the like. Additionally, the driving wheel itself is structurally operatively associated with the fluid motor in an extremely simple manner, thus facilitating the assembly and disassembly thereof with respect thereto.

Certain directional terminology, such as "inwardly," "outwardly," "adjacent," and the like has been used in the foregoing description to facilitate an understanding of the present invention. This relative terminology is intended in its normal and accepted sense, and, therefore, is to be given the broadest possible interpretation, and construction, particularly if and when used in the ensuing claims. It is, however, not in any way to be considered limiting.

While the invention has been shown, illustrated, described and disclosed in terms of embodiments or modifications which it has assumed in practice, the scope of the invention should not be deemed limited by the precise embodiment or modifications hereinshown, illustrated, described or disclosed, such other embodiments or modifications intended to be reserved especially as they fall within the scope of the claims here appended.

What is claimed is:

1. A fluid motor particularly adapted for use as a component part of a driving wheel comprising: a stationary shaft member having: a base portion, said base portion comprising: a plurality of conduits integral therewith; a flange portion, said flange portion comprising: a plurality of passage arrangements providing communication from said fluid conduits having: a plurality of radially extending bores; and a plurality of sets of annular groove portions; one of said bores communicating, at one end thereof, with an end of one of said conduits, and with one of said groove portions at the other end thereof; a housing member enclosing the flange portion of said shaft member, and comprising: a first annular housing plate rotatably mounted on the base portion of said shaft member adjacent one surface of said flange portion; a second annular housing plate rotatably mounted on said base portion adjacent another surface of said flange portion; each of said annular plates extending radially outwardly of said base portion a distance greater than said flange portion; and a ring disposed radially outwardly of said flange portion and between said plates, and being connected thereto, so as to be rotatable therewith; one of said flange portion and said ring having a plurality of equi-spaced segments positioned thereabout; another of said flange portion and said ring having a plurality of equi-spaced radially extending groove portions positioned thereabout; a vane member radially reciprocally disposed in each of said groove portions; a spring positioned in each of said groove portions for resiliently urging said vane members into mutual cooperative engagement with that one of said flange portion and said ring having said chambers; said first and second plates each of them comprising: an annular bearing housing located adjacent to the base portion of said shaft member; roller bearings positioned within said bearing housings; an annular bearing seal ring located axially outwardly of said bearing housings to preclude leakage of fluid outwardly of said annular plates and along said base portions; an annular flange portion sealing ring located radially outwardly of each of said bearings, and in sealing engagement with said one and said other surface of said flange portions; a spring urging each of said annular flange portion sealing rings into sealing engagement with the faces of said flange portion; a gap extending between each of said flange portion sealing rings and said bearings, enabling fluid that enters said gap to be communicated to said bearings, further enabling the lubrication thereof; a one-way sealing ring located radially inwardly of and adjacent to each of said flange portion rings to preclude leakage therealong in one direction, further enabling fluid pressure to be directed to said gap past said flange portion sealing ring, and to enable leakage therealong in another direction, still further enabling said fluid motor to be internally case drained to that one of said conduits connected to an exhaust; internal fluid passages extending between the bearing housing in each of said annular plates, enabling the fluid that lubricates on the high pressure side of the flange portion of said shaft member to be communicated to the low pressure side thereof, further enabling lubrication of the bearing on the latter side of said flange portion; one system of passages for conveying fluid under pressure from one of said plurality of passage arrangements to one of each of said segments; and another system of passages for draining fluid from another end of each of said chambers to another of said passage arrangements enabling selective draining and conveying of fluid from and to selected groups of said segments.

2. A fluid motor as defined in claim 1, wherein: said segments are located in said ring, enabling said ring to define a camming portion; and said grooves are positioned in said flange portion; enabling said vanes to radially reciprocally extend outwardly of said flange portion into engagement with said camming portion.

3. A fluid motor as defined in claim 1, wherein: said segments are located in said flange portion, enabling said flange portion to define a camming portion; and said grooves are positioned in said ring; enabling said vanes to radially reciprocally move outwardly of said ring into engagement with said camming portion.

4. A fluid motor as defined in claim 2, wherein: each set of annular groove portions are located in each face of said flange portion and in end to end spaced apart relationship; said system of passages for conveying fluid under pressure comprises: a plurality of channels of U-shaped configuration; said channels being positioned in one of said first and second annular plates, and extending from one of said sets of annular groove portions to said one end of each of said segments to provide communication therebetween; said system of passages for draining fluid comprises: a plurality of channels of U-shaped configuration; said channels for draining fluid being positioned in the other of said first and second annular plates, and extending from the other end of said segments to the other of said sets of annular groove portions.

5. A fluid motor as defined in claim 3, wherein: said annular groove portions are located within said flange portion; and said system of passages for conveying fluid under pressure comprises: a plurality of radially extending passages positioned in the flange portion of said shaft member; said passages extending from one of said sets of annular groove portions to said one end of each of the segments; and said system of passages for draining fluid comprises: a plurality of radially extending passages positioned in said flange portion; said passages for draining fluid extending from the other end of each of said segments to the other of said sets of annular groove portions.

6. A fluid motor particularly adapted for use as a component part of a driving wheel, comprising: a shaft member having: a plurality of fluid conduits; and one passage arrangement for providing communication from one of said fluid conduits; and another passage arrangement for providing communication with another of said fluid conduits; said plurality of passage arrangements comprising: a plurality of radially extending bores; and a plurality of sets of annular groove portions; said sets of annular groove portions being located in each of a plurality of faces of said shaft member; a housing member enclosing said shaft member, and comprising: a plurality of housing plates mounted on said shaft member for rotatable movement thereabout; and a ring positioned between said plates, and being connected thereto for rotation therewith; one of said shaft members and said rings having a plurality of segments; another of said shaft member and said ring having a plurality of vanes; said segments defining a camming portion; and said vanes being positioned to radially reciprocally extend into engagement with said camming portions; said housing plates each of them comprising: bearings located therein adjacent said shaft member, enabling said housing member to rotate with respect thereto; a sealing arrangement for substantially preclude leakage from each of said passage arrangements and between said housing plates and said shaft member; said sealing arrangement enabling a portion of a fluid in one of said passage arrangements to flow therepast towards said bearings for the lubrication thereof; one system of passages for conveying fluid under pressure from one of said fluid conduits to one end of each of said segments through one of said passage arrangements; said system of passages for conveying fluid under pressure comprising: a plurality of channels positioned in said housing member, and extending from one of said sets of annular groove portions to said one end of each of said segments to provide communication therebetween; and another system of passages for draining fluid from another end of said segments through another of said passage arrangements to another of said fluid conduits; said system of passage for draining fluid comprising: a plurality of channels; said channels for draining fluid being positioned in said housing member, and extending from the other end of said segments to the other of said sets of annular groove portions; enabling the selective conveying to and draining from of fluid to groups of said segments, each of said sealing arrangements comprising a sealing ring positioned in each of said housing plates, and being located radially outwardly of each of said bearings; a biasing element urging each of said sealing rings into sealing engagement with said shaft member; a gap extending between each of said sealing rings and said bearings, enabling fluid that leaks past said sealing rings to be communicated to said bearings for the lubrication thereof; and a one-way sealing ring located radially inwardly of and adjacent to each of said flange portion rings to preclude leakage therealong in one direction, further enabling fluid pressure to be directed to said gap past said flange portion sealing ring, and to enable leakage therealong in another direction, still further enabling said fluid motor to be internally case drained to that one of said conduits connected to an exhaust.

7. A fluid motor as defined in claim 6, wherein there is provided: a bearing housing positioned in each of said housing plates; said bearings being disposed in said bearing housings; and internal fluid passages extending between the bearing housings in each of said housing plates, enabling the fluid that lubricates on a high pressure side of said shaft member to be communicated to a low pressure side thereof, further enabling lubrication of the bearings on the latter side of said shaft member.

8. A fluid motor particularly adapted for use as a component part of a driving wheel, comprising:
a shaft member having
a flange presenting axially spaced faces;
a plurality of fluid conduits;
one passage arrangement for providing communication from one of said fluid conduits; and
another passage arrangement for providing communication with another of said fluid conduits;
said plurality of passage arrangements comprising:
a plurality of generally radially extending bores; and
a plurality of sets of annular groove portions, said sets of annular groove portions being located in each of said faces of said flange;
a housing member enclosing said shaft member, and comprising:
a plurality of housing plates mounted on said shaft member for rotatable movement thereabout;
a ring positioned between said plates and being connected thereto for rotation therewith;
said shaft member and said ring forming a plurality of segments therebetween each of which define a camming surface;
one of said shaft member and said ring having a plurality of vanes positioned to radially reciprocally move into engagement with said camming surface;

each of said housing plates comprising:

one system of passages for conveying fluid under pressure from one of said fluid conduits to one end of each of said segments through one of said passage arrangements, said system of passages for conveying fluid under pressure comprising channels in said housing member extending from one of said sets of annular grooves to said one end of said segments to provide communication therebetween;

another system of passages for draining fluid from another end of said segments through another of said passage arrangements to another of said fluid conduits; said system for draining fluid comprising channels in said housing member extending from the other of said sets of annular grooves to the other end of said segments.

9. The fluid motor of claim 8 wherein said channels of said system for conveying fluid under pressure define generally U-shaped flow paths having one leg extending from said one of the sets of annular grooves and having the other leg extending to said one end of said segments; and said channels of said system for draining fluid define generally U-shaped flow paths having one leg extending from said other of said sets of annular grooves and having the other leg extending to the other end of said segment.

10. A fluid motor comprising:

a shaft member having a flange thereon;

a housing member enclosing said flange and comprising:

a plurality of housing plates mounted on said shaft member for rotatable movement thereabout;

a ring positioned between said plates and being connected thereto for rotation therewith;

said shaft member and said ring forming a plurality of segments therebetween each of which defines a camming surface;

one of said shaft members and said ring having a plurality of vanes positioned to radially reciprocally move into engagement with said camming surface;

said shaft member further comprising:

a plurality of conduits;

one passage arrangement for providing communication from one of said fluid conduits; and another passage arrangement for providing communication with another of said conduits;

said passage arrangements comprising:

a plurality of generally radially extending bores;

at least one set of annular groove portions, said at least one set of annular groove portions being located within said flange member;

one of said bores communciating with one of said annular groove portions;

another of said bores communicating with another of said annular groove portions;

a pluraltiy of first channels in communication with said one annular groove portions extending toward one end of said segments; and a plurality of second channels in communication with said another groove portion extending toward the other end of said segments.

11. The fluid motor of claim 10 wherein said vanes are mounted in said ring.

References Cited

UNITED STATES PATENTS

| | | | |
|---|---|---|---|
| 470,064 | 3/1892 | Lycon | 91—73 |
| 602,630 | 4/1898 | Smith | 91—73 X |
| 615,664 | 12/1898 | Dearing | 91—140 X |
| 727,677 | 5/1903 | Olsen | 91—70 X |
| 2,843,434 | 7/1958 | Orloff | 277—29 |
| 3,008,424 | 11/1961 | Roth | 91—67 X |
| 3,035,554 | 5/1962 | Selzler | 91—140 X |
| 3,067,831 | 12/1962 | Willock | 91—73 X |
| 3,280,934 | 10/1966 | De Biasi | 180—66 |

MARTIN P. SCHWADRON, *Primary Examiner.*

G. N. BAUM, *Assistant Examiner.*